United States Patent [19]
Mitchell

[11] 3,738,531
[45] June 12, 1973

[54] LIQUID PUMPING SYSTEM

[75] Inventor: Thomas O. Mitchell, Muskegon, Mich.

[73] Assignee: Bennett Pump Incorporated, Muskegon, Mich.

[22] Filed: Feb. 10, 1971

[21] Appl. No.: 114,288

[52] U.S. Cl. ............................. 222/52, 137/624.27
[51] Int. Cl. ............................................... B67d 5/34
[58] Field of Search .................... 222/52, 73, 75; 73/40.5; 137/624.27

[56] References Cited
UNITED STATES PATENTS 2,880,909   4/1959   Caymer et al. ...................... 222/75
2,997,207   8/1961   Botkin et al. ...................... 222/73 X Primary Examiner—Robert B. Reeves
Assistant Examiner—Frederick R. Handren
Attorney—Thomas M. Marshall, Esq.

[57] ABSTRACT

A control system for the dispensing of gasoline includes leak detector means disposed in the main supply line, and a switch means responsive to the attitude of the leak detector means and operative to control the discharge of fluid from the dispenser nozzle valve. By this arrangement, the switch means insures that the leak detector means is in its fully opened position, prior to discharge of fluid from the dispenser nozzle valve.

10 Claims, 3 Drawing Figures

LIQUID PUMPING SYSTEM

BACKGROUND

The present invention pertains to a control system for fluids that are intermittently delivered under pressure, and more particularly, systems for detecting malfunctions in the intermittent delivery of gasoline from a supply tank to the outlet nozzle of a gasoline dispensing pedestal of a service station.

In dispensing gasoline at a service station, it is usual to have a submerged pump located in the gasoline supply line leading to the nozzle valve at the dispensing pedestal. The gasoline in the supply line is under pressure during a dispensing operation, and if there is a leak in the supply line, the fluid will flow through the lower pressure area around the line. Of course, this can create an extremely hazardous condition because of the extreme flamability of gasoline, and accordingly, detection of leaks is one of the primary considerations in a gasoline service station installation.

Heretofore, leak detection systems generally comprise a pressure responsive detector located in the supply line extending between the supply tank and the valve outlet. Any unbalance between the pressure in the supply line and the pressure developed upon operation of the submerged pump in the fuel storage tank will cause the leak detector to be actuated, thereby either completely closing off the supply of gasoline from the supply tank to a valved outlet, or otherwise reducing the supply pressure to an unacceptable level for efficient operation of the service station. These leak detection systems also include means for then supplying additional flow to the supply line at a predetermined rate, and the system then determined whether leakage exists. If the pressure equalized, the system would return to normal and the leak detector means would fully open thereby allowing operation of the gasoline pumping system.

A decrease in the pressure of the supply line can be caused by various different conditions. One primary condition, and one which is most dangerous, is the existence of a leak in the various conduits extending from the supply tank to the nozzle valve outlets which causes both a hazardous condition and an uneconomical situation.

Another condition, and one which cannot readily be avoided, is the contraction of gasoline due to temperature variations. For example, during the winter months in certain geographical regions, the temperature of the gasoline in the storage tank below ground may be 50° F. whereas the temperature of the gasoline in the supply line, which is fairly close to ground level, may be 0°F. When the latter condition exists, it often occurs that the attendant at the service station will open the dispenser nozzle prior to the leak detector system going through its full cycle wherein additional flow is provided to the supply line. Upon opening of the dispenser nozzle, with the dispenser main valve open, a rapid decrease of the pressure in the supply line is sensed by the leak detector valve, thereby causing the latter to return to or stay in its fully closed or restricted position. The operator must then wait an indeterminable period of time prior to again opening the dispenser nozzle. If the attendant again opens the nozzle prior to the full cycling of the leak detector means, the leak detector will close for a second time, thereby restricting the flow of fluid through the dispenser nozzle. The operator must then close the nozzle, wait another indeterminate period of time, and hope that when he does open the nozzle for the third time, the leak detector valve had completed its full cycle and is in the fully opened position. From the above, it is apparent that the operation of conventional systems could present an extreme annoyance to the service station attendant.

SUMMARY

The present invention provides a switch means to prevent the premature discharge of fluid from the dispenser nozzle prior to the leak detector valve completing its cycle and returning to its fully opened position. The switch means may take the form of a fluid pressure responsive switch, as described hereinafter. However, it will be understood that other switch means such as a switch actuated mechanically by the opening of the leak detector valve will serve an identical purpose. Accordingly, with the leak detector valve whether closed or partially closed, the switch means prevents the discharge of fluid through the dispenser nozzle, even though the dispenser nozzle valve has been actuated by the attendant. The switch means, e.g., a fluid pressure responsive switch, maintains the fluid in the supply conduit until the pressure thereof is sufficient to fully open the leak detector valve, after which the pressure responsive switch provides a signal to the dispenser main valve to allow the opening thereof for the discharge of fluid. At such time the gasoline pumping system is in its fully operative position.

These and other advantages will become apparent as the invention becomes better understood from the following detailed description when taken in conjunction with the drawings.

DRAWINGS

DESCRIPTION

Figure 1:
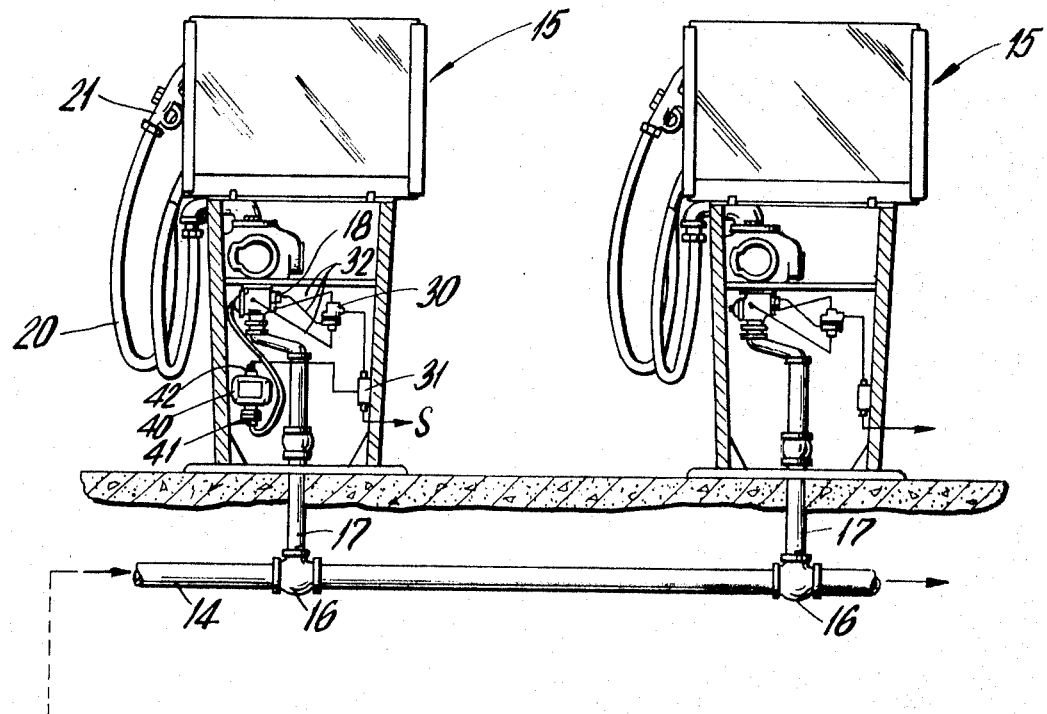
FIG. 1 is a diagrammatic view of a service station installation having the control system of the present invention applied thereto.
Figure 1:
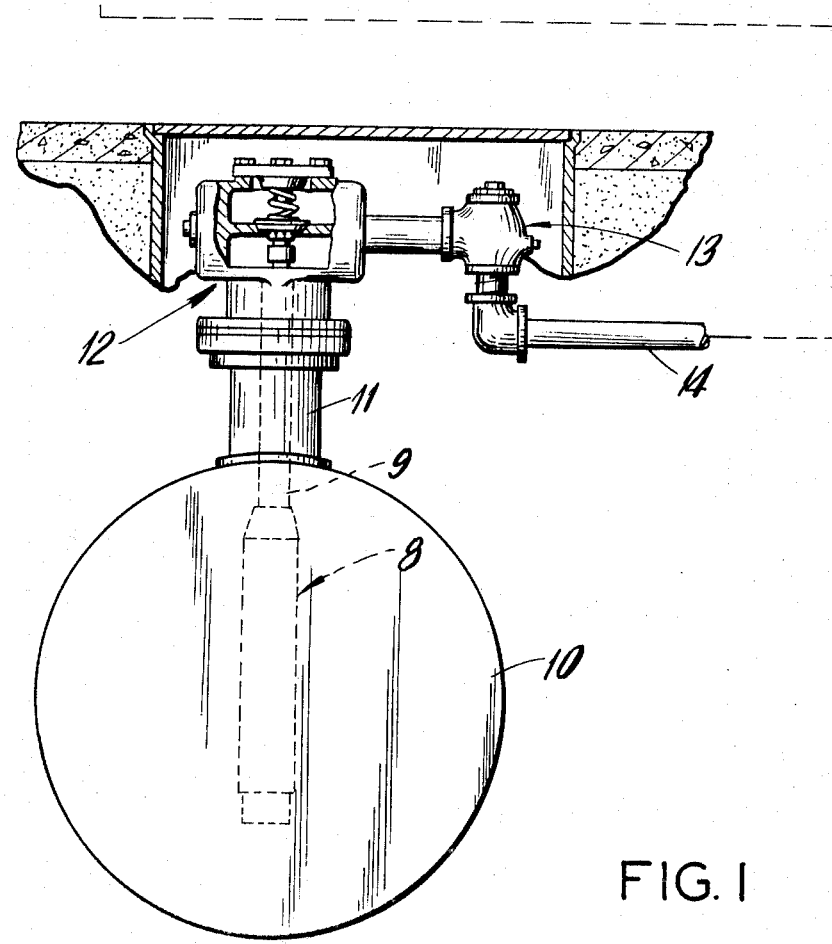

Referring to FIG. 1, numeral 10 designates an underground storage tank for gasoline, having disposed therein a submerged pump and motor 8 supported by riser 11. The pump is in communication with a conduit 9, and in conventional fashion a check valve 12 and leak detector valve 13 are provided in the conduit 9. On the downstream side of the leak detector valve 13 is the main supply line 14 which extends to one or more pedestals 15 where the gasoline is dispensed to vehicles. Located adjacent each pedestal 15 is a coupling 16 which is provided in the supply line 14 and is connected to an auxiliary conduit 17 in communication with a main valve and filter assembly 18. The main valve and filter assembly 18 connects to a delivery hose 20 having at its opposite end the dispenser nozzle valve 21. Operation of the main valve and filter assembly 18 is controlled by a solenoid 30 which is electrically connected to a junction box 31 to which the source of electricity S is connected from a main power supply.

Each pedestal 15 includes the basic elements mentioned above. Extending from the solenoid 30 are a plurality of suitable fluid connections 32 running to the main valve and filter assembly 18. Also connected to the solenoid 30 is an electrical connection extending from a suitable switch (not shown) located adjacent to the dispenser nozzle 21. In operation, when the dispenser nozzle 21 is removed from its hanger, the dispenser operating handle may be turned to the "ON" position and causes the switch to provide a signal to the solenoid 30 causing the main valve and filter assembly 18 to operate. Simultaneously, a signal is sent to the pump and the motor located in the underground tank 10 so as to provide pressurized fluid to the supply line.

Up to this point, the system as described is generally conventional in construction. As previously noted, one of the main problems with this type of system is that should contraction occur in the supply line 14 thereby causing the leak detector valve 13 to fully close or partially close, actuation of the dispenser main valve 18 and nozzle valve 21 will cause a further decrease of the pressure in the supply line 14 thereby fully closing the leak detector valve 13. The result is that only a small amount of gasoline is provided through the nozzle valve 21. At this point, it is necessary for the operator to release the nozzle valve 21, and wait for a period of time in order for the pressure to build in the supply line to a sufficient point whereby the leak detector valve is completely cycled and returned to its fully opened position. If the operator should actuate the nozzle valve 21 prior to the full cycling of the leak detector valve 13, the leak detector valve will again be actuated thereby again closing off the supply of gasoline to the supply line 14. Hence, it is necessary for the operator to again wait a period of time for the leak detector valve to complete its cycle of operation. As is readily apparent, the operation of this system can create quite a nuisance, and it is the object of the control system of the present invention to obviate this situation.

As illustrated in FIG. 1, the pedestal 15 illustrated on the left hand side includes an additional element in the form of a switch means or pressure switch 40 which is connected by a fluid conduit 41 to the main valve and filter assembly 18, and by an electrical conduit 42 to the solenoid 30.

Figure 2:
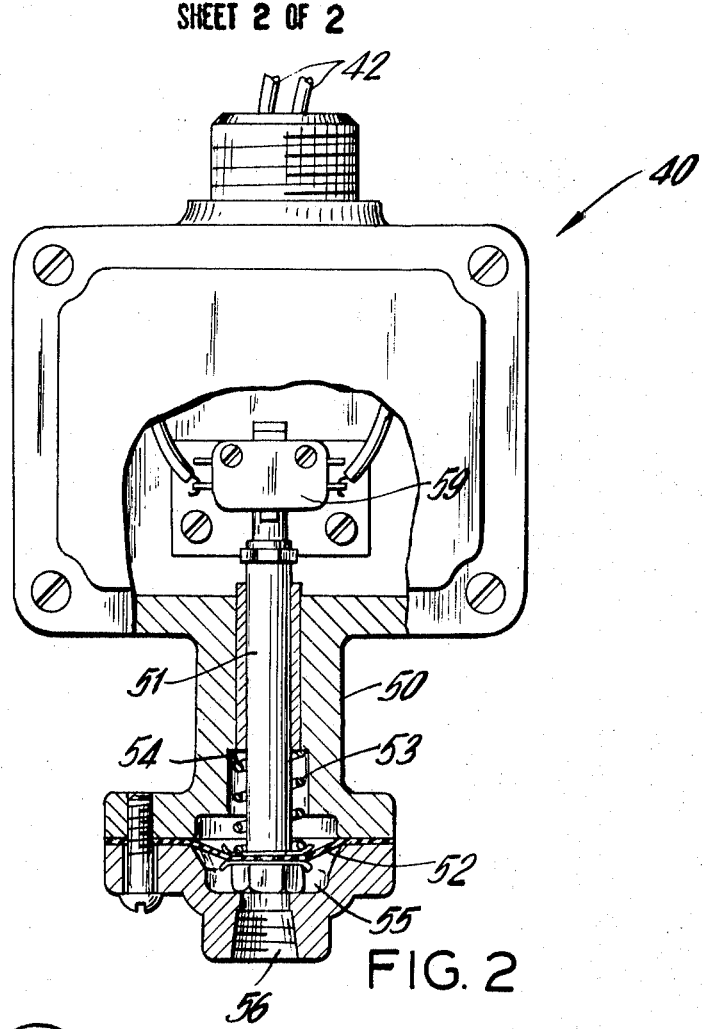
FIG. 2 is a vertical view, partly in section, of the pressure switch of the present invention.

A partial sectional view of the pressure switch 40 is illustrated in FIG. 2. Pressure switch 40 includes a tubular housing 50 having moveably mounted therein a plunger 51. Plunger 51 is operatively connected to a flexible diaphragm 52 which is biased in one direction by a spring 53 disposed about the plunger 51. The opposite end of spring 53 bears against a shoulder 54 in the housing 50. The lower portion of the diaphragm defines with the housing 50 a fluid chamber 55 which is in communication with the main valve and filter assembly 18 via opening 56 and the conduit 41. The upper end of the moveable piston 51 shows a portion of a conventional electrical switch 59 connected by leads 42 to the solenoid valve 30. The pressure switch 40 is illustrated in the open condition wherein the pressure of the spring 53 is greater than the force provided by the pressurized gasoline in the lower chamber 55. It is readily apparent that as the pressure in the fluid supply line 14 is increased, the force of the fluid pressure acting on the lower portion of the diaphragm 52 will overcome the axial force of the spring 53 to cause closing of switch 59.

The fundamental purpose of pressure switch 40 is to maintain the main valve and filter assembly 18 in a closed condition when the pressure in the supply line 14 is below that pressure required for maintaining the leak detector valve 13 in a predetermined position, e.g., fully open. Accordingly when the nozzle valve 21 is operated, assuming that insufficient fluid pressure exists in the supply line 14 to keep the leak detector valve fully open, the pressure valve 40 will prevent the main valve and filter assembly 18 from opening thereby providing the flow of fluid through the delivery hose 20 and out the nozzle valve 21. This obstruction of the flow of fluid from nozzle valve 21 enables the pressure in the supply line 14 to build up to a suitable point to fully open the leak detector valve 13. As the pressure in supply line 14 increases to the pre-determined value, the pressure of the gasoline flowing through the opening 56 and into the chamber 55 will overcome the force of the spring 53 thereby closing switch 59 and correspondingly opening the main valve and filter assembly 18. At such time, pressurized gasoline will flow through the main valve and filter assembly 18 and through the delivery hose 20 to the nozzle valve 21.

Figure 3:
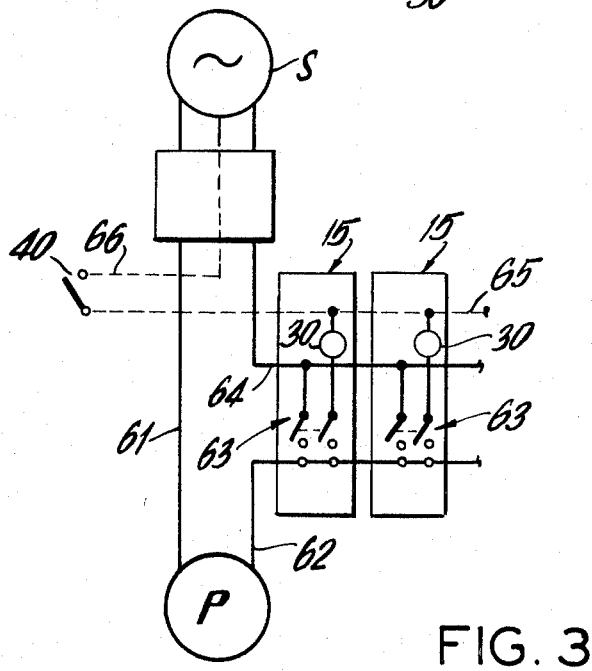
FIG. 3 is a circuit diagram of the control system of the present invention.

Turning to FIG. 3, an electrical circuit diagram of the control system of the subject invention is illustrated. The electrical source S is connected via a line 61 to the submerged motor and pump, indicated by the letter P. In turn, the motor and pump is connected via line 62 to each of the pedestals 15, and in each of the pedestals is a suitable double pole switch 63. One of the poles of each switch 63 is connected via a line 64 to complete the circuit from the main source S to the motor and pump P. Accordingly, when one of the double pole switches 63 is closed, upon actuation of the dispenser switch located adjacent to the nozzle valve 21, the electrical power from the source S to the motor and pump P is completed, and the pump is actuated thereby providing pressurized fluid to the supply line 14. The other pole of each double pole switch 63 connects line 62 through the solenoid 30 and to a neutral line 65 that connects to one side of the pressure switch 40. The opposite side of the pressure switch 40 is connected via a line 66 to the source S. Accordingly, it is readily apparent that operation of the solenoid valve 30 to control opening of the main valve and filter assembly 18 to provide pressurized flow to the delivery hose 20 and the nozzle valve 21 is conditioned on closing of the pressure switch 40. As previously noted, pressure switch 40 is only actuated when the pressure of the gasoline in the supply line is sufficient to maintain the leak detector valve 13 in the full open position to provide the desired flow through the nozzle valve 21.

It is noted that only one pressure switch 40 is required for either one or a plurality of pedestals 15. In each case, the solenoid of the pedestal 15 is connected to a common neutral line 65 extending to one pole of the pressure switch 40. It is also noted that the switch means may take the form of a mechanical or electrical switch which is responsive to the operational position of the leak detector valve.

The present invention thus provides an improved system for controlling the flow of pressurized fluid from a storage tank to a nozzle valve, and provides improved means for regulating the discharge of fluid under abnormal conditions where the pressure in the supply line is temporarily reduced.

While a preferred embodiment of the present invention has herein been illustrated and described, this has been done by way of illustration and not limitation, and the inventor should not be limited except as required by the scope of the appended claims.

What is claimed is:

1. A system for controlling the dispensing of fluid from a fluid supply line in which fluid is intermittently delivered under pressure and wherein the supply line pressure can vary over a wide range between a low pressure and a relatively higher delivery pressure comprising:
a source of supply of pressurized fluid;
a supply line connected to said source of supply at one end and fluid dispensing means at its opposite end;
leak detector valve means provided in said supply line, which leak detector valve means is operative to temporarily prevent free flow to the supply line when the differential between the supply line pressure and the delivery pressure from the source of supply is more than a pre-selected amount; and
switch means operative in response to the operational position of said leak detector valve means to prevent flow of fluid through said fluid dispensing means until the differential pressure between the supply line pressure and the delivery pressure from the source of supply is equal to or less than said pre-selected amount.

2. A system as in claim 1 wherein a check valve is provided in the supply line between the source of supply and the leak detector valve means.

3. A system as in claim 1 wherein the fluid dispensing means includes a main valve and filter assembly, a delivery hose and a dispenser nozzle.

4. A system as in claim 1 wherein the switch means comprises a fluid pressure responsive switch.

5. A system as in claim 1 wherein the switch means comprises a mechanical switch operative in response to the operational position of the leak detector valve means.

6. A system as in claim 1 wherein a plurality of fluid dispensing means are provided, each fluid dispensing means being connected to said supply line.

7. A liquid pumping system as in claim 1 wherein said switch means comprises a fluid pressure responsive switch having a tubular housing having slideably mounted therein a spring biased plunger, said plunger operatively connected to a flexible diaphragm, said flexible diaphragm and tubular housing defining a chamber for receiving pressurized fluid from said supply line, the opposite end of said moveable plunger activating an electrical switch for controlling said fluid dispensing means.

8. A liquid pumping system including a storage tank, a least one remote delivery outlet, a supply line extending from the tank to the delivery outlet, a pump at said tank, means including a selectively actuatable control switch for controlling operation of said pump, a first valve means in said supply line adjacent said outlet, a second valve means in said supply line adjacent said tank, leak detector valve means in said supply line intermediate said first and second valve means and operative to prevent the free flow of fluid from the tank to the delivery outlet when the differential in the pressure in the supply line upstream and downstream of the leak detector valve is more than a predetermined amount, and means responsive to the leak detector valve means for controlling said first valve, whereby said first valve is maintained in its closed position until the leak detector valve means has assumed a pre-determined position.

9. A liquid pumping system as in claim 8 wherein said second valve comprises a check valve for trapping the liquid in the supply line between said first and second valve means.

10. A liquid pumping system as in claim 8 wherein a plurality of remote delivery outlets are provided, each of which is connected to said supply line.

* * * * *